United States Patent
Zhu et al.

(10) Patent No.: US 11,521,059 B2
(45) Date of Patent: Dec. 6, 2022

(54) DEVICE AND A METHOD FOR PROCESSING DATA SEQUENCES USING A CONVOLUTIONAL NEURAL NETWORK

(71) Applicant: Aptiv Technologies Limited, St. Michael (BB)

(72) Inventors: Weimeng Zhu, Wuppertal (DE); Yu Su, Wuppertal (DE); Christian Nunn, Huckeswagen (DE)

(73) Assignee: Aptiv Technologies Limited, St. Michael (BB)

( * ) Notice: Subject to any disclaimer, the term of this patent is extended or adjusted under 35 U.S.C. 154(b) by 917 days.

(21) Appl. No.: 16/373,939

(22) Filed: Apr. 3, 2019

(65) Prior Publication Data

US 2019/0325306 A1 Oct. 24, 2019

(30) Foreign Application Priority Data

Apr. 23, 2018 (EP) .................................... 18168781

(51) Int. Cl.
*G06T 7/70* (2017.01)
*G06N 3/08* (2006.01)
(Continued)

(52) U.S. Cl.
CPC ............. *G06N 3/08* (2013.01); *G06N 3/0445* (2013.01); *G06N 3/0454* (2013.01); *G06T 7/70* (2017.01);
(Continued)

(58) Field of Classification Search
CPC ...... G06N 3/08; G06N 3/0445; G06N 3/0454; G06V 10/454; G06V 10/82; G01C 21/005; G06T 17/05
See application file for complete search history.

(56) References Cited

U.S. PATENT DOCUMENTS 9,760,806 B1  9/2017  Ning et al.
10,701,394 B1  6/2020  Caballero
(Continued)

FOREIGN PATENT DOCUMENTS

WO    2016160237    10/2016

OTHER PUBLICATIONS

"Final Office Action", U.S. Appl. No. 16/374,138, dated Feb. 8, 2021, 25 pages.
(Continued)

*Primary Examiner* — Abdul-Samad A Adediran
(74) *Attorney, Agent, or Firm* — Sawtooth Patent Group PLLC

(57) ABSTRACT

A device for processing data sequences by means of a convolutional neural network is configured to carry out the following steps: receiving an input sequence comprising a plurality of data items captured over time using a sensor, each of said data items comprising a multi-dimensional representation of a scene, generating an output sequence representing the input sequence processed item-wise by the convolutional neural network, wherein generating the output sequence comprises: generating a grid-generation sequence based on a combination of the input sequence and an intermediate grid-generation sequence representing a past portion of the output sequence or the grid-generation sequence, generating a sampling grid on the basis of the grid-generation sequence, generating an intermediate output sequence by sampling from the past portion of the output sequence according to the sampling grid, and generating the output sequence based on a weighted combination of the intermediate output sequence and the input sequence.

20 Claims, 11 Drawing Sheets

(51) Int. Cl.
    *G06N 3/04*  (2006.01)
    *G06V 10/44*  (2022.01)
    *G06V 10/82*  (2022.01)
    *G06T 7/73*  (2017.01)

(52) U.S. Cl.
    CPC .............. *G06T 7/75* (2017.01); *G06V 10/454* (2022.01); *G06V 10/82* (2022.01)

(56) References Cited

U.S. PATENT DOCUMENTS

| | | | |
|---|---|---|---|
| 10,739,773 | B2 | 8/2020 | Vernaza et al. |
| 11,049,018 | B2 | 6/2021 | Yang et al. |
| 11,195,038 | B2 | 12/2021 | Nunn et al. |
| 2007/0022063 | A1 | 1/2007 | Lightowler |
| 2017/0193310 | A1 | 7/2017 | Yu et al. |
| 2017/0255832 | A1 | 9/2017 | Jones et al. |
| 2017/0301104 | A1* | 10/2017 | Qian .................. G01C 21/005 |
| 2018/0096259 | A1 | 4/2018 | Andrews et al. |
| 2018/0211403 | A1 | 7/2018 | Hotson et al. |
| 2018/0232947 | A1 | 8/2018 | Nehmadi et al. |
| 2019/0042850 | A1 | 2/2019 | Jones et al. |
| 2019/0066372 | A1* | 2/2019 | Falk-Wallace .......... G06T 17/05 |
| 2019/0124346 | A1 | 4/2019 | Ren et al. |
| 2019/0171939 | A1 | 6/2019 | Zhu et al. |
| 2019/0325241 | A1 | 10/2019 | Nunn et al. |
| 2019/0347485 | A1 | 11/2019 | Yang et al. |
| 2020/0301013 | A1 | 9/2020 | Banerjee et al. |
| 2021/0104086 | A1 | 4/2021 | Wang et al. |

OTHER PUBLICATIONS

"Foreign Office Action", EP Application No. 18168786.4, dated Sep. 2, 2021, 4 pages.
"Summons to Attend Oral Proceedings", EP Application No. 1720540.2, Jul. 30, 2021, 6 pages.
"Extended European Search Report", EP Application No. 17205540.2, dated Jun. 11, 2018, 10 pages.
"Extended European Search Report", EP Application No. 18168786.4, dated Oct. 16, 2018, 10 pages.
"Extended European Search Report", EP Application No. 18168781.5, dated Oct. 29, 2018, 11 pages.
"Foreign Office Action", EP Application No. 17205540.2, dated May 4, 2020, 5 pages.
"Non-Final Office Action", U.S. Appl. No. 16/374,138, dated Aug. 19, 2020, 17 pages.
Cho, "Learning Phrase Representation using RNN Encoder-Decoder for Statistical Machine Translation", Sep. 3, 2014, 15 pages.
Chung, "Empirical Evaluation of Gated Recurrent Neural Networks on Sequence Modeling", Dec. 11, 2014, 9 pages.
Dai, et al., "Deformable Convolutional Networks", Jun. 5, 2017, 12 pages.
Dequaire, et al., "Deep Tracking in the wild: End-to-end tracking using recurrent neural networks", Jun. 22, 2017, pp. 492-512.
Fayyaz, et al., "STFCN: Spatio-Temporal FCN for Semantic Video Segmentation", Sep. 2, 2016, 17 pages.
Hubel, et al., "Receptive Fields, Binocular Interaction and Funtional Archtecture in Cat's Visual Cortex", Jul. 1961, pp. 106-154.
Jaderberg, et al., "Spatial Transformer Networks", Feb. 4, 2016, 15 pages.
Long, et al., "Fully Convolutional Networks for Semantic Segmentation", Mar. 8, 2015, 10 pages.
Ondruska, et al., "Deep Tracking: Seeing Beyond Seeing Using Recurrent Neural Networks", Mar. 8, 2016, 8 pages.
Patraucean, et al., "Spatio-temporal video autoencoder with differentiable memory", Sep. 1, 2016, 13 pages.
Qi, et al., "PointNet: Deep Learning on Point Sets for 3D Classification and Segmentation", Conference on Computer Vision and Pattern Recognition (CVPR) 2017, Jul. 2017, pp. 652-660.
Ren, et al., "Faster R-CNN: Towards Real-Time Object Detection with Region Proposal Networks", Jan. 6, 2016, 14 pages.
Ronnenberger, et al., "U-Net: Convolutional Networks for Biomedical Image Segmentation", May 18, 2015, 8 pages.
Shi, et al., "Convolutional LSTM Network: A Machine Learning Approach for Precipitation Nowcasting", Sep. 15, 2015, 12 pages.
Tokmakov, "Learning Video Object Segmentation with Visual Memory", Jul. 12, 2017, 11 pages.
Zhou, et al., "VoxelNet: End-to-End Learning for Point Cloud Based 3D Object Detection", Nov. 17, 2017, 10 pages.
"Foreign Office Action", EP Application No. 18168781.5, dated Jun. 4, 2021, 6 pages.
"Notice of Allowance", U.S. Appl. No. 16/374,138, filed Jul. 9, 2021, 13 pages.
Chung, et al., "A Two Stream Siamese Convolutional Neural Network for Person Re-identification", Dec. 2017, pp. 1992-2000.
Du, et al., "Recurrent Spatial-temporal Attention Network for Action Recognition in Videos", Mar. 2018, pp. 1347-1360.
Peng, et al., "Multi-region Two-stream R-CNN for Action Detection", Sep. 2016, pp. 744-759.
Wang, "Two-Stream SR-CNNs for Action Recognition in Videos", Jan. 2016, 12 pages.
McLaughlin Niall et al: "Recurrent Convolutional Network for Video-Based Person Re-identification", Jun. 27, 2016, pp. 1325-1334.

* cited by examiner

DEVICE AND A METHOD FOR PROCESSING DATA SEQUENCES USING A CONVOLUTIONAL NEURAL NETWORK

TECHNICAL FIELD OF INVENTION

This disclosure generally relates to processing data sequences using a convolutional neural network.

BACKGROUND OF INVENTION

Convolutional neural networks (CNNs) are employed for many applications, especially for applications in which large amounts of data need to be processed for extracting a desired information from the data. For example, the data can represent image or video data which capture one or more objects present in a (real) scene. CNNs have shown to be useful to automatically extract information which characterizes the scene captured by the data more closely, for example information about the position and the motion of objects in the scene. In other words, CNNs can be configured to perform a semantic analysis of the data (i.e., by pattern recognition). As one possible application, a machine can be controlled on the basis of this analysis. The scene can for example be a traffic scene in the surrounding of a vehicle which should be controlled on the basis of an automatic semantic analysis of the traffic scene. This is known as an autonomous driving application.

A CNN is a structural representation of a computer-implemented method for processing data. It comprises processing the data with convolutional kernels which are filter masks comprising a plurality of values (i.e., filter weights) arranged in a predefined pattern. The convolutional kernel is convolved with the input data in order to process the data. A constant may be added to the result of the convolution followed by filtering with a so-called activation function, as is known to those skilled in the field of neural networks. These processing steps may form a structural unit of the CNN often referred to as a convolutional layer. The use of convolutional kernels is helpful for avoiding a modification of the spatial pattern in the input data. Therefore, any input data that has a spatial pattern, e.g., images and videos, can be processed by CNNs. Furthermore, convolutional kernels provide superior efficiency of processing when large amounts of data need to be processed.

A problem of ordinary CNNs is that they are, as such, not configured to process time-dependent data, i.e. sequences of data captured sequentially over time. This is to say that an ordinary CNN assumes a data item, e.g. a "block" of input data, to have one common time stamp, which may be the case for a video frame. Therefore, an input sequence of data items is usually processed sequentially, i.e. by processing one data item after the other. A disadvantage of this approach is that time-dependencies in the data are not explicitly recognized by the CNN.

Time-dependencies are present in most types of real data, for example in data, which represents real scenes, e.g., of a traffic environment. This is because objects, in particular moving objects such as vehicles, pedestrians and the like can only move smoothly because of their speed limitation. Such time dependencies are very important for achieving a robust extraction of the desired information, such as a detection of objects or a classification thereof (image classification). One reason is that (real) data is usually captured under non-optimum conditions. Furthermore, objects can suddenly appear and disappear due to occlusions with other objects. Such phenomena are also known as object birth and object death. Therefore, extracting information from data of complex scenes usually requires the use of temporal information in order to carry out a robust semantic analysis of the data.

There have been efforts towards enabling CNNs to recognize time-dependencies in sequential data, for example in the form of recurrent neural networks (RNN) and long-short-term memories (LSTM). However, it turned out that these types of neural networks are not always powerful enough to cope with complex data such as data representing a scene with many different moving objects. It is understood that this data can be captured by means of a camera. However, in other applications, in particular modern vehicular applications, the data can be captured by other sensors as well, including one or more radar sensors or a light detection and ranging (lidar) system. In connection with these applications, the data usually represents a traffic scene in the surrounding of the vehicle, wherein different types of sensor data may be available for combination. The traffic scene needs to be analysed constantly and reliably from the data in order to enable safe autonomous driving applications. Yet, a robust extraction of the required information has proven difficult with the known types of CNNs.

SUMMARY OF THE INVENTION

The problem underlying the invention is to provide a device and a method for processing data sequences using a CNN, wherein time-dependencies are efficiently and reliably considered by the CNN.

In one embodiment, the device is configured to receive an input sequence comprising a plurality of data items captured over time, each of said data items comprising a multi-dimensional representation of a scene. In other words, each data item corresponds to one time instant in which the scene has been captured in two, three or more dimensions, i.e. multiple parameters which may include spatial coordinates but also velocity information. The sequence of data items can be interpreted as a complex video, wherein the frames of the video correspond to data items representing a scene at a particular time instant. The input sequence can be raw data from one or more sensors but can also be a pre-processed version thereof.

The CNN of the device is configured to generate an output sequence representing the input sequence processed item-wise by the convolutional neural network, i.e., the input sequence is processed sequentially, preferably in the order of the input sequence. Also preferably, the output sequence comprises a plurality of data items, each data item corresponding to a processed version of the respective data item of the input sequence.

The CNN comprises a sampling unit configured to generate an intermediate output sequence by sampling from a past portion of the output sequence according to a sampling grid. The past portion of the output sequence may consist of the very last data item of the output sequence but may also include data items further down from the history of the output sequence. By reusing a past portion in the CNN for processing a current data item of the input sequence a form of recursive processing is implemented by the CNN. The intermediate output sequence is a modified version of the past portion of the output sequence, wherein the modification is carried out item-wise by a sampling of the data item. This sampling is useful for taking account of dynamic changes in the data, which may be regarded as an adaption of the data for improving the processing of the input sequence. This will be explained further below.

The CNN is configured to generate the sampling grid item-wise on the basis of a grid-generation sequence, wherein the grid-generation sequence is based on a combination of the input sequence and an intermediate grid-generation sequence. The intermediate grid-generation sequence represents a past portion of the output sequence or a past portion of the grid-generation sequence. The grid-generation sequence therefore comprises information of the current input sequence and the "processing history". This history may be provided either in the form of the past portion of the output sequence (e.g., the last data item of the output sequence) or the past portion of the grid-generation sequence (e.g., the last data item of the grid-generation sequence) which again represents a form of recursive processing.

The CNN is further configured to generate the output sequence based on a weighted combination of the intermediate output sequence and the input sequence. The combination can be interpreted as a controlled prediction of the output sequence, wherein for example either more or less of the input sequence is allowed to pass the CNN. Due to the recursive processing, the intermediate output sequence also represents information about the previous behaviour of the input sequence and the output sequence. Therefore, time-dependencies are explicitly analysed by the CNN and directly influence the processing of the input sequence viz. generation of the output sequence. This enables the CNN to achieve a better robustness in accurately considering, i.e. recognizing temporal information present in the input data sequence. This means that information, which is also encoded through time dependencies, can be extracted with increased accuracy, for example motion data of objects and object-detection data. Furthermore, the analysis of the data is improved with respect to objects which suddenly appear and disappear due to occlusions (e.g., object birth and object death).

It is noted that, the weighted combination is not limited to a direct weighting of the mentioned sequences. As the case may be, any of the sequences can be processed prior to weighting. For example, the input sequence can be processed by an inner CNN which results in an intermediate input sequence which represents the (raw) input sequence.

The CNN according to the invention can be a so-called deep neural network. In particular, the CNN can comprise a plurality of inner CNNs. These inner CNNs are regarded as sub-networks, i.e. layers, of an "outer" CNN, in particular the CNN according to the invention. These inner CNNs can have the same, similar, or different structures but they all comprise a convolution of the input data with a convolutional kernel. In addition, it can be that the convolution result is added to a constant and that an activation function is applied, which can be a function configured to perform a transformation to a predefined scale, for example a scale of [0, 1], i.e. the output data is between zero and one. Examples for activation functions are the sigmoid function and the tan h function. Another example is a two-sided threshold function.

Preferably, each of the sequences addressed herein comprises a plurality of data items, each data item comprising a plurality of data points. In this way, any processing of a data item can involve a processing of the data points. The data items can be processed one by one. Alternatively, data items may be processed in parallel or in combinations of data items.

Embodiments of the invention are given in the dependent claims, the description and the figures.

Preferably, the grid-generation sequence is based on an item-wise combination of the input sequence and the intermediate grid-generation sequence. For example, the CNN can be configured to form the grid-generation sequence by an item-wise combination of the input sequence and the intermediate grid-generation sequence. The combination can be a concatenation of the two involved sequences per item, wherein the concatenation can be adapted such that a subsequent processing of the concatenated data item allows for a separate processing of the two items forming the concatenation. As an alternative to a concatenation, the two sequences can be combined by a dedicated neural network, preferably also a CNN. In a specific case, this CNN can be a convolutional gated recurrent unit (GRU), which is a type of RNN described in: Tokmakov, P., Alahari, K. and Schmid, C., 2017, Learning Video Object Segmentation with Visual Memory. arXiv preprint arXiv:1704.05737. In another specific case, the CNN for combining the two sequences can be a convolutional LSTM. Preferably, this convolutional LSTM is implemented as described in: Xingjian, S. H. I., Chen, Z., Wang, H., Yeung, D. Y., Wong, W. K. and Woo, W. C., 2015: "Convolutional LSTM network: A machine learning approach for precipitation nowcasting". Advances in neural information processing systems (pp. 802-810).

According to a preferred embodiment the intermediate grid-generation sequence is formed by the past portion of the output sequence, in particular wherein the past portion of the output sequence is processed with an inner CNN. Alternatively, the intermediate grid-generation sequence can be formed by the past portion of the grid-generation sequence processed with an inner CNN.

The sampling grid is preferably generated by processing the grid-generation sequence with at least one inner CNN. This is preferably carried out item-wise, i.e., one sampling grid is generated from one data item of the grid-generation sequence. Therefore, a sequence of sampling grids can be formed. However, there is preferably only one sampling grid per time step. In other words, in the (outer) CNN there is no grid sequence but only one grid per time.

According to a further embodiment the convolutional neural network is configured to generate the output sequence by carrying out the following steps. As a first step, a first weighting sequence and a second weighting sequence are generated based on one of the input sequence, the intermediate output sequence, the intermediate grid-generation sequence, the grid-generation sequence processed by an inner convolutional network, or a combination thereof. Both weighting sequences can be generated on the same basis or differently. For example, each weighting sequence can be generated on different combinations of the above sequences.

As a next step, an intermediate input sequence is generated by processing the input sequence with an inner CNN. Then, the intermediate output sequence is weighted with the first weighting sequence and the intermediate input sequence is weighted with the second weighting sequence. These two weighted sequences are then superimposed, e.g. by simply adding the sequences, preferably item-wise. The weighting can be a multiplication, in particular a point-wise multiplication, which is also known as the Hadamard product. In the latter case, each involved sequence is composed of data items which comprise a plurality of data points.

In one embodiment, the generating the first weighting sequence and/or the second weighting sequence comprises:
—forming a combination, e.g. a concatenation, of at least two of the input sequence, the intermediate output sequence, the intermediate grid-generation sequence, the grid-generation sequence processed by an inner convolutional network;

—forming a processed combination by processing the combination with an inner convolutional neural network. This inner CNN is preferably configured to process with a convolutional kernel and an activation function, in particular sigmoid function.

In a further embodiment one of the first weighting sequence or the second weighting sequence is formed by the processed combination and wherein the other of the first weighting sequence or the second weighting sequence is formed by the processed combination subtracted from a constant.

In general, the convolutional neural network can be configured to generate the first and second weighting sequences correspondingly. However, it is understood that the processing parameters for each weighting sequence can be different, in particular any convolutional kernels used for processing the sequences.

Having regard to the sampling unit, the sampling grid preferably comprises a plurality of sampling locations, each of the sampling locations being defined by a respective pair of an offset and one of a plurality of data points of an item of the intermediate output sequence. So an offset represents a location shift of a data point which is underlying the offset. Therefore, the sampling grid defines where the past portion of the output sequence is to be sampled relative to the regular data points of the intermediate output sequence. This can be regarded as a specific form of processing which is controlled through the generated sampling grid. Preferably, the grid is adapted to predict motion in the data. Therefore, the data represented by a given data item can be optimized in view of the temporal changes in the previous data items. The motion data can be represented by the offsets, which can be regarded as vectors pointing to the desired sampling location. The sampling unit can be configured to perform an interpolation of data points. Therefore, if a sampling location is between given data points of the data item to be sampled, the sampled data point can simply be interpolated from one or more neighbouring data points, e.g., by bi-linear interpolation.

According to a preferred embodiment each data item of the input sequence comprises a plurality of data points, each data point representing a location in the scene and comprising a plurality of parameters, in particular coordinates, of the location. In particular, the data points of each data item of the input sequence can be formed by an image comprising a plurality of pixels. This is to say that the data points can be formed by pixels in which each data item represents the scene preferably in two or three dimensions. In general, each of the sequences described herein can be formed of data items corresponding to the data items of the input sequence with regard to their structure.

The invention also relates to a system for processing data sequences, the system comprising a sensor for capturing a data sequence and a device according to one of the embodiments described herein. The sensor can comprise at least one of a radar sensor, an light-detection-and-ranging sensor, an ultrasonic sensor or a camera. As the skilled person understands, each of such sensors is suitable for capturing a scene and thus to generate the input sequence. The system can be implemented in a vehicle, such as an ordinary passenger car. The system can therefore be configured to generate an output sequence which represents (relevant) information for an autonomous driving application. This is to say that the vehicle can be controlled, e.g., steered, on the basis of the output sequence generated by the CNN implemented in the device of the method.

The invention is further related to a method for processing data sequences by means of a CNN, the method comprising: receiving an input sequence comprising a plurality of data items captured over time using a sensor, each of said data items comprising a multi-dimensional representation of a scene, generating an output sequence representing the input sequence processed item-wise by the convolutional neural network, wherein generating the output sequence comprises: generating a grid-generation sequence based on a combination of the input sequence and an intermediate grid-generation sequence representing a past portion of the output sequence or the grid-generation sequence, generating a sampling grid on the basis of the grid-generation sequence, generating an intermediate output sequence by sampling from the past portion of the output sequence according to the sampling grid, and generating the output sequence based on a weighted combination of the intermediate output sequence and the input sequence.

As is known to those skilled in the art, a CNN is configured for processing by a training of the CNN. During training of a CNN, there are usually two steps, feed-forward and back-propagation. In feed-forward, the network receives input data and calculates the output data using initial processing parameters (i.e. filter weights and constants). Then, given the correct output data, the parameters are updated during back-propagation, wherein the gradient from a loss function is calculated (gradient descent).

It is understood that each of the inner CNNs can be different in terms of the involved processing parameters, in particular the weights of the convolutional kernel and the activation function.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention is described further by way of a plurality of examples which are illustrated in the figures in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
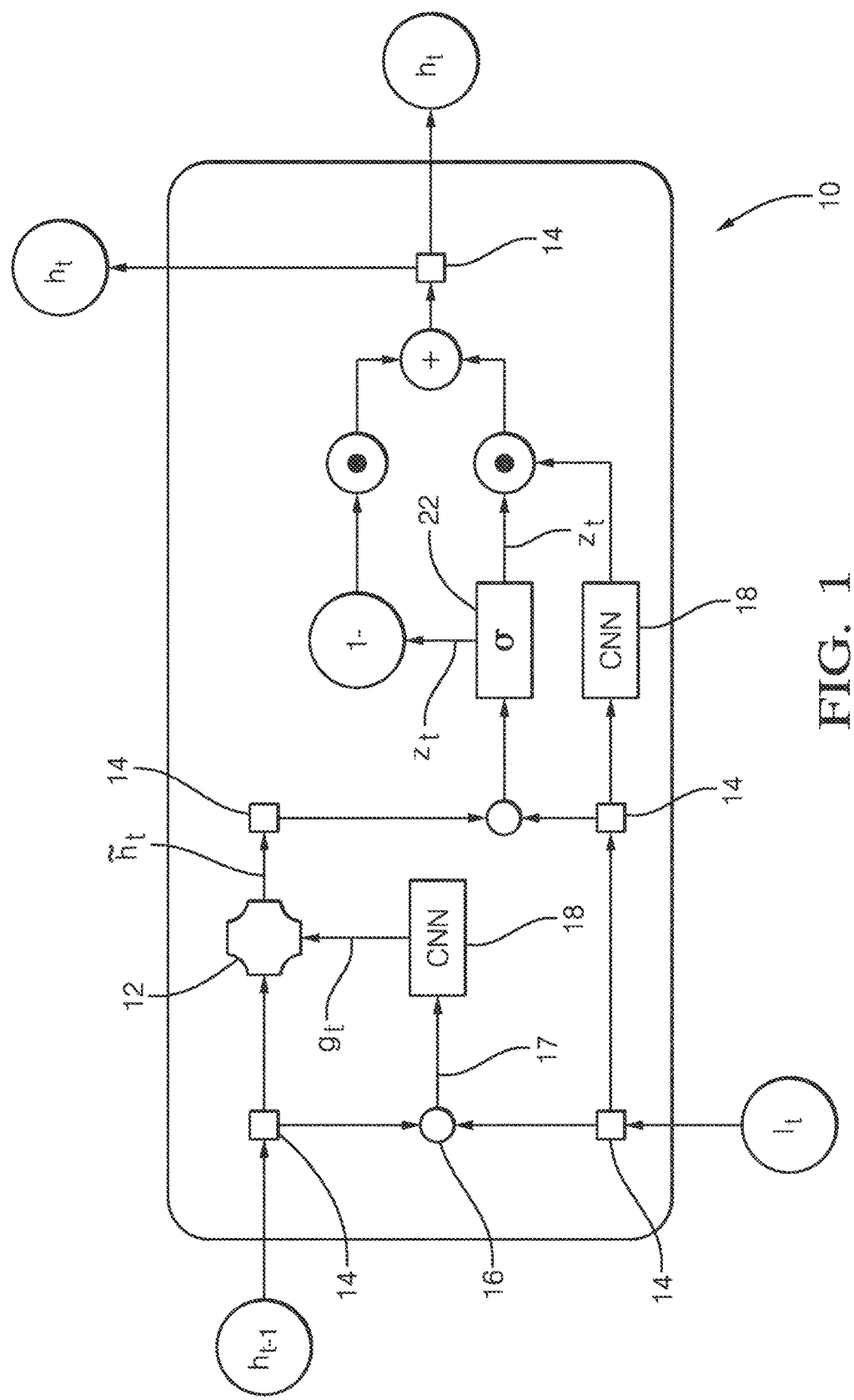
FIGS. 1 to 10 show variants of CNNs for processing data sequences as schematic block diagrams.

A first example of a CNN 10 in shown in FIG. 1. The processing of an input sequence $I_t = \{ \ldots I_{t-2}, I_{t-1}, I_t, I_{t+1}, \ldots \}$ with t being a sequence index and each element of the sequence being a data item can be described by the following set of equations:

$$G_t = \mathrm{CNN}(I_t, h_{t-1})$$

$$\tilde{h}_t = \mathrm{Sample}(h_{t-1}, G_t)$$

$$z_t = \sigma(W_{iz}*I_t + W_{hz}*\tilde{h}_t + b_z)$$

$$h_t = (1-z_t)\odot\tilde{h}_t + z_t\odot\mathrm{CNN}(I_t)$$

The variables $h_t$ and $\tilde{h}_t$ stand for an output sequence and an intermediate output sequence, respectively. The variable $z_t$ represents a weighting sequence. Each data item of the sequences comprises a plurality of data points, for example pixels of an image.

In the formulas, * denotes the convolutional operator and ⊙ denotes a point-wise multiplication (Hadamard product). W indicates a convolutional kernel, with the indices indicating the variables to which the kernel refers. "Sample" denotes sampling by means of a sampling unit 12, with the first argument being the input to the sampling unit 12 and the second argument being the sampling grid.

In FIG. 1, the solid black squares 14 generally denote a "duplication" of information, which means that the arrows leaving the squares 14 carry the same information as the input arrow. The solid black circles 16 generally denote a combination of information. For example the past portion of the output sequence, $h_{t-1}$, is concatenated with the input sequence $I_t$ to form an intermediate grid generation sequence at 17. This sequence is then processed by CNN 18, which is generally an inner CNN. The result is the sampling grid $G_t$ in the case of FIG. 1. CNN( ) is an operator in the equations, wherein the arguments of CNN( ) refer to a combination of the arguments, e.g., a concatenation.

Similarly, the intermediate output sequence $\tilde{h}_t$ is concatenated with the input sequence $I_t$ followed by processing with block 22 as defined in the equations above, wherein σ denotes the sigmoid function. Block 22 is a specific form of an inner CNN.

As can be seen from the above formulas for $h_t$, the input sequence is processed with another inner CNN 18. The result, i.e. $\mathrm{CNN}(I_t)$ is an intermediate input sequence.

The general convention as described in connection with FIG. 1 is the same in FIGS. 2 to 8.

Figure 2:
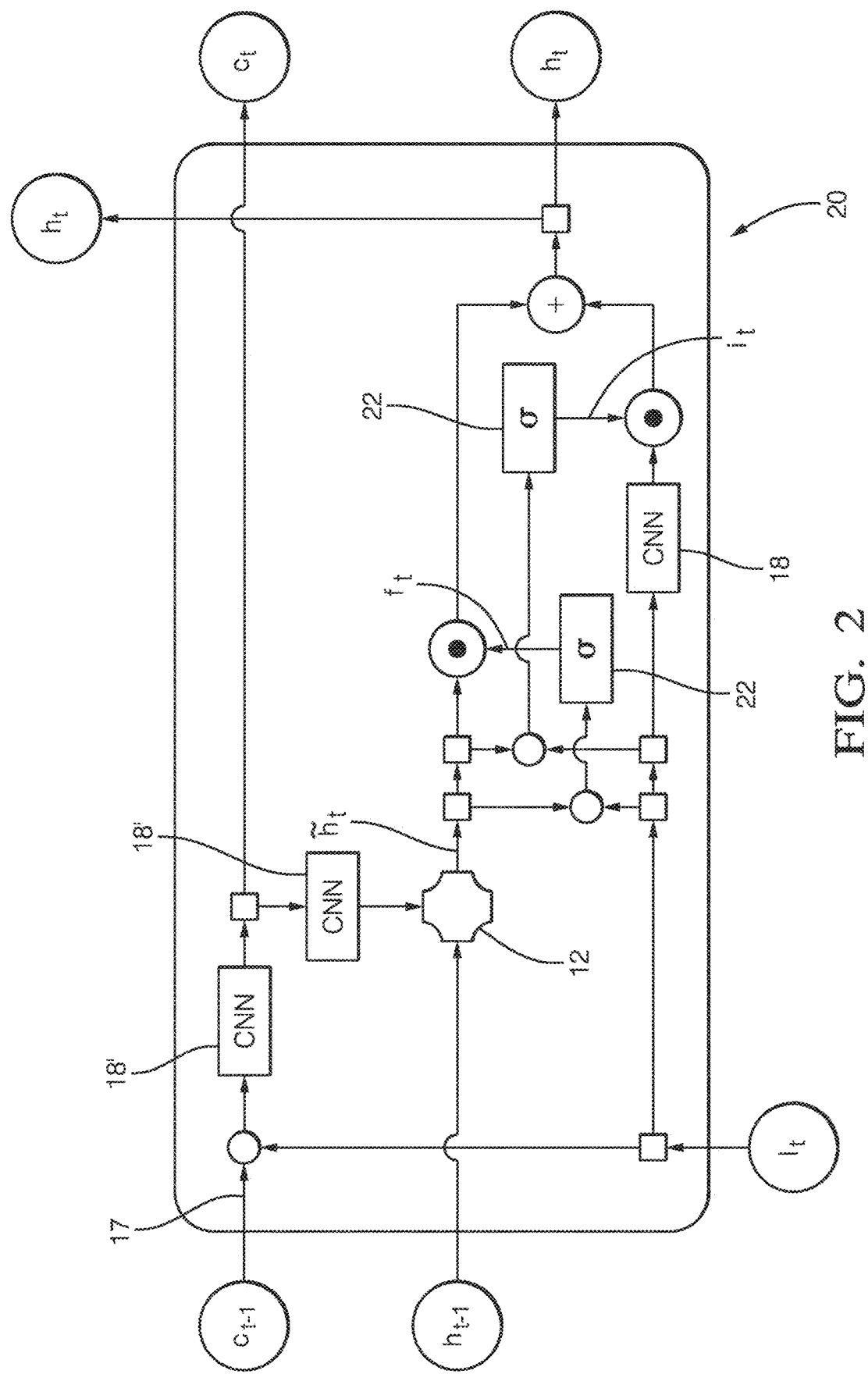

A second example, CNN 20, is shown in FIG. 2 and is defined by the following set of equations:

$$C_t = \mathrm{CNN}(I_t, C_{t-1})$$

$$G_t = \mathrm{CNN}(C_t)$$

$$\tilde{h}_t = \mathrm{Sample}(h_{t-1}, G_t)$$

$$i_t = \sigma(W_{Ii}*I_t + W_{hi}*\tilde{h}_t + b_i)$$

$$f_t = \sigma(W_{If}*I_t + W_{hf}*\tilde{h}_t + b_f)$$

$$h_t = f_t \odot \tilde{h}_t + i_t \odot \mathrm{CNN}(I_t)$$

In contrast to the first example, the grid-generation sequence is formed on the basis of a combination of the input sequence $I_t$ and an intermediate grid-generation sequence $C_{t-1}$. As can be seen from FIG. 2, the combination is processed by inner CNN 18 which gives $C_t$, a processed version of the grid-generation sequence, which recursively forms the intermediate grid-generation sequence of the next time step ($C_{t-1}$). The processed version of the grid-generation sequence is further processed by an inner CNN 18' to give the sampling grid $G_t$.

A further aspect of the CNN 20 is that the first weighting sequence $f_t$ and the second weighting sequence $i_t$ are formed correspondingly by blocks 22, which have the same input, namely a combination of the intermediate output sequence and the input sequence.

Figure 3:
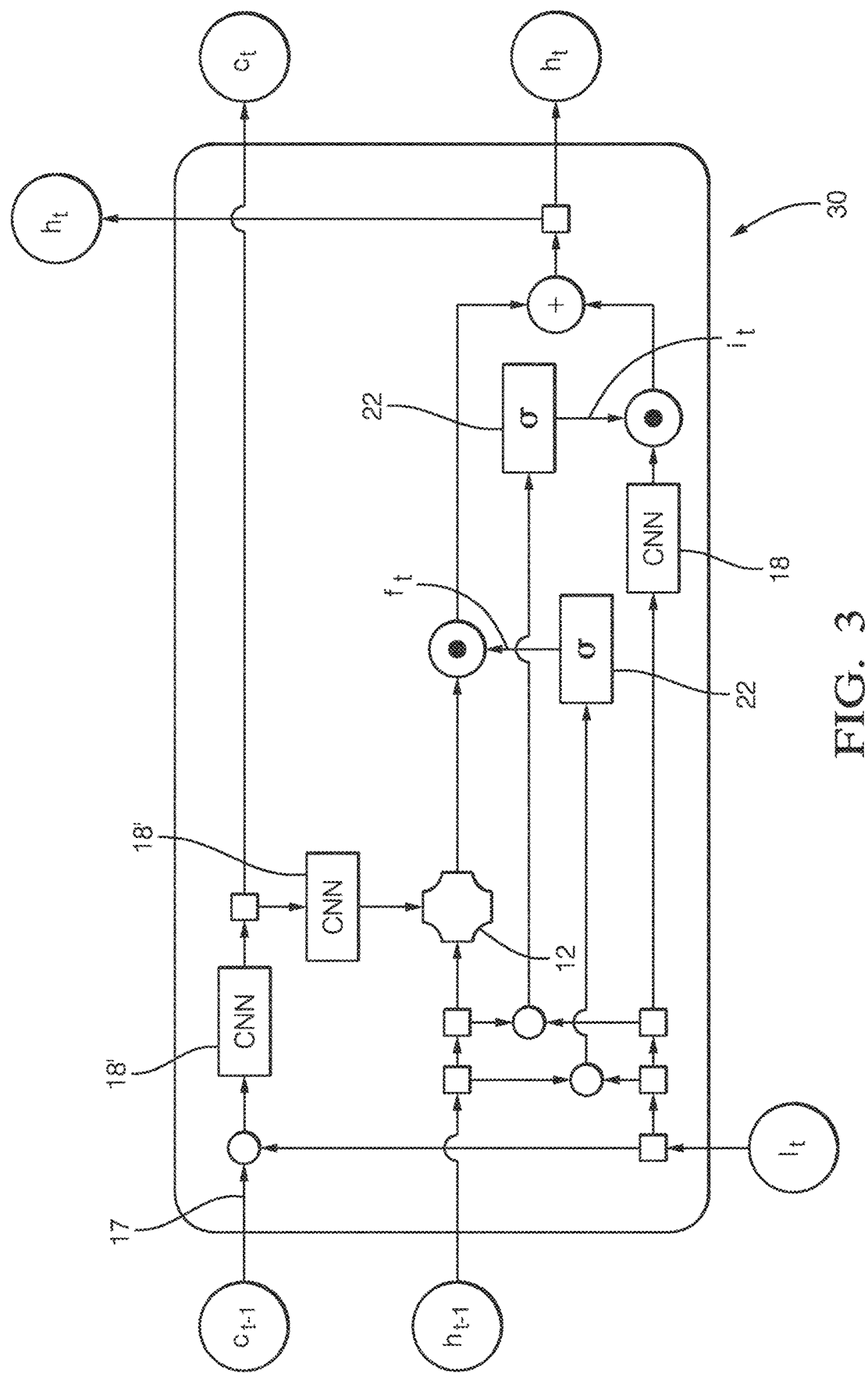

The CNN 30 shown in FIG. 3 forms a third example described by:

$$C_t = \mathrm{CNN}(I_t, C_{t-1})$$

$$G_t = \mathrm{CNN}(C_t)$$

$$\tilde{h}_t = \mathrm{Sample}(h_{t-1}, G_t)$$

$$i_t = \sigma(W_{Ii}*I_t + W_{hi}*h_{t-1} + b_i)$$

$$f_t = \sigma(W_{If}*I_t + W_{hf}*h_{t-1} + b_f)$$

$$h_t = f_t \odot \tilde{h}_t + i_t \odot \mathrm{CNN}(I_t)$$

The CNN 30 deviates from the CNN 20 in that the first and second weighting sequences $f_t$ and $i_t$ are based on a combination of the past portion of the output sequence $h_{t-1}$ and the input sequence.

Figure 4:
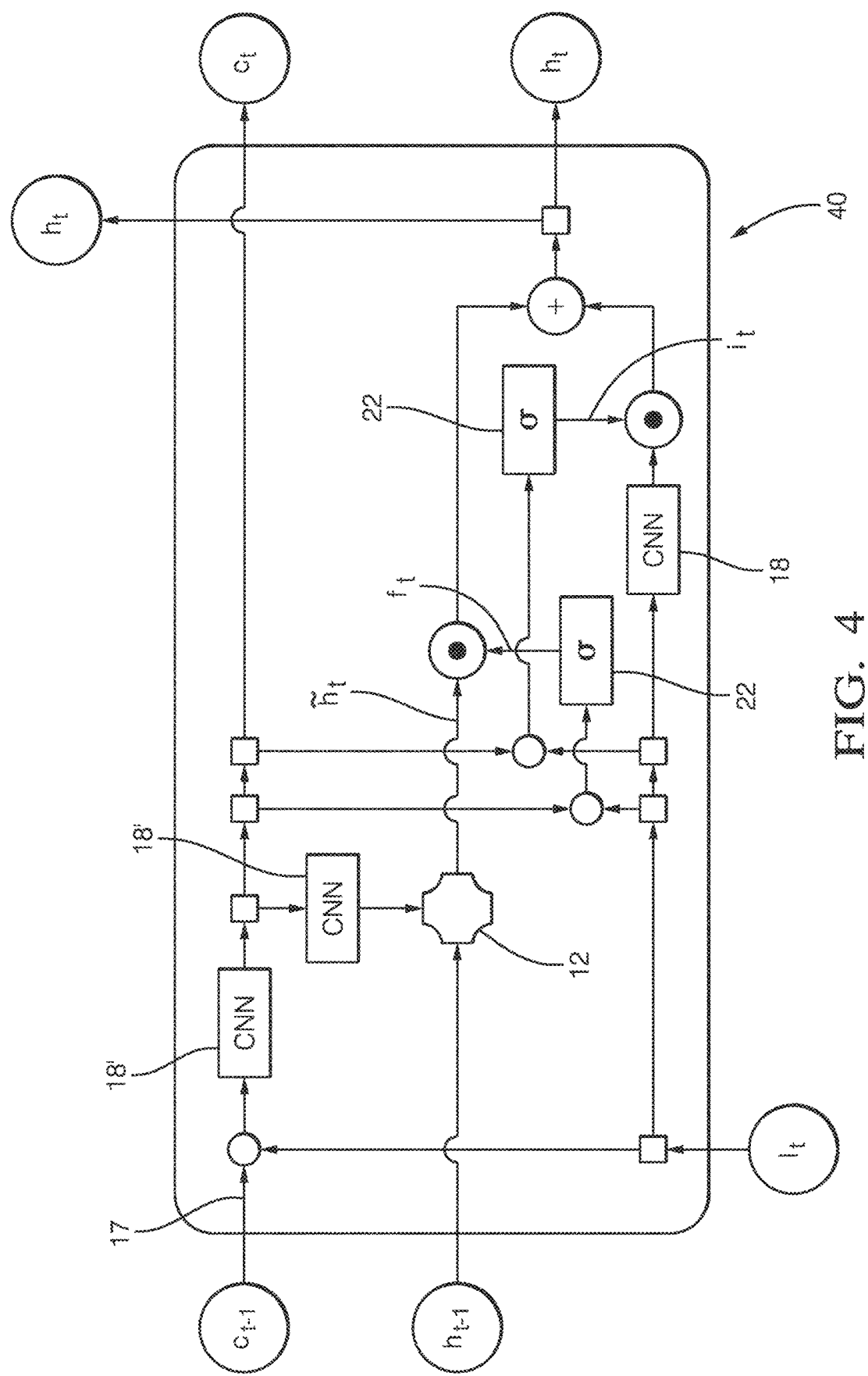

A fourth example is given by CNN 40 in FIG. 4. It is described by the following set of equations:

$$C_t = \mathrm{CNN}(I_t, C_{t-1})$$

$$G_t = \mathrm{CNN}(C_t)$$

$$\tilde{h}_t = \mathrm{Sample}(h_{t-1}, G_t)$$

$$i_t = \sigma(W_{Ii} * I_t + W_{ci} * C_t + b_i)$$

$$f_t = \sigma(W_{If} * I_t + W_{cf} * C_t + b_f)$$

$$h_t = f_t \odot \tilde{h}_t + i_t \odot \text{CNN}(I_t)$$

The CNN 40 deviates from the CNNs 20 and 30 in that the first and second weighting sequences $f_t$ and $i_t$ are based on a combination of the grid-generation sequence processed by inner CNN 18 and the input sequence.

Figure 5:
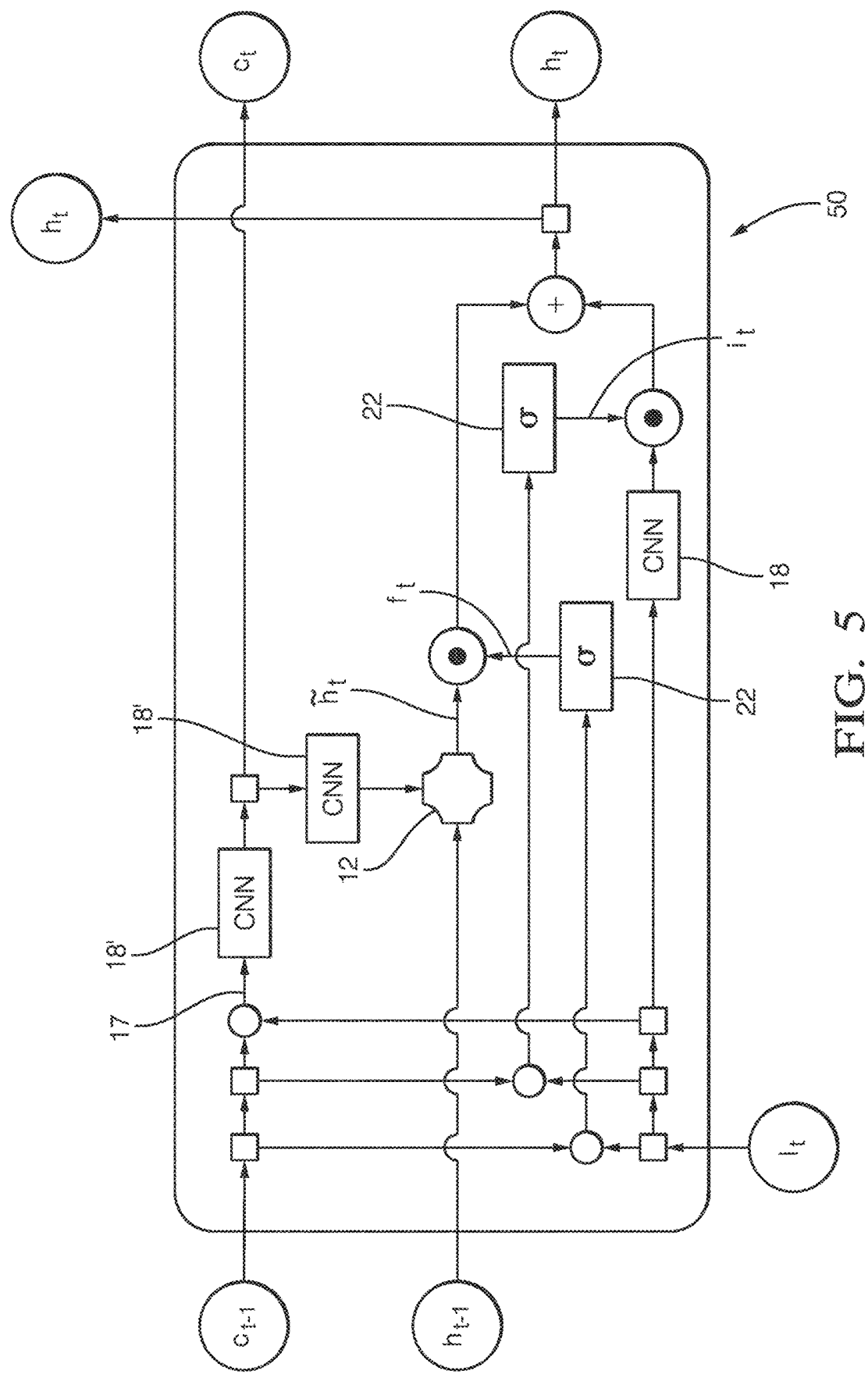

A fifth example is given by CNN 50 shown in FIG. 5. The following set of equations applies:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{Ii} * I_t + W_{ci} * C_{t-1} + b_i)$$

$$f_t = \sigma(W_{If} * I_t + W_{cf} * C_{t-1} + b_f)$$

$$h_t = f_t \odot \tilde{h}_t + i_t \odot \text{CNN}(I_t)$$

As can be seen in FIG. 5 and in the equations, the first and second weighting sequences $f_t$ and it are based on a combination of the intermediate grid-generation sequence $C_{t-1}$ and the input sequence $I_t$. In addition, the grid-generation sequence formed at 17 is formed by the same combination.

Figure 6:
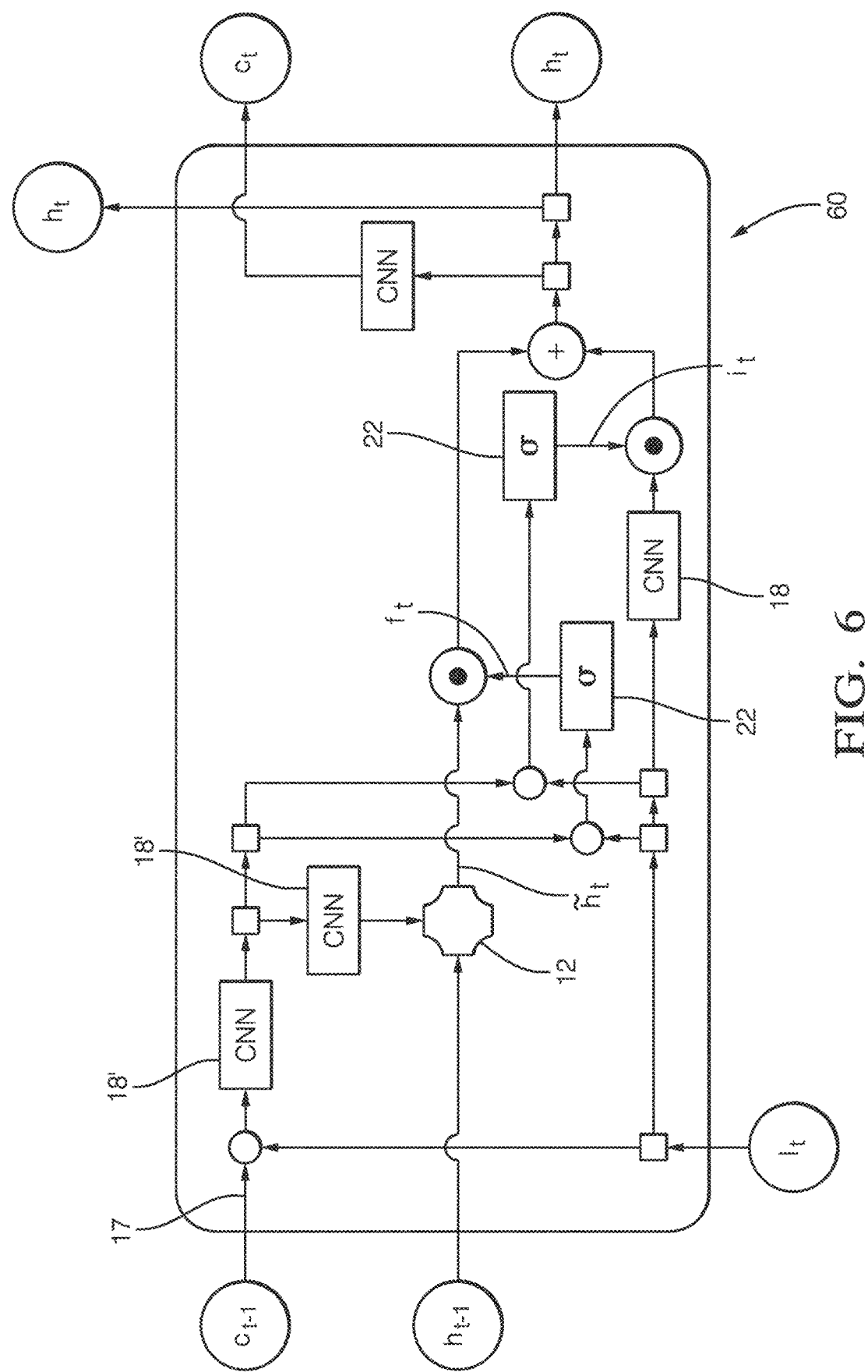

A sixth example is given by CNN 60 shown in FIG. 6. The following set of equations applies:

$$\tilde{C}_t = \text{CNN}(I_t, C_{t-1})$$

$$G_t = \text{CNN}(\tilde{C}_t)$$

$$\tilde{h}_t = \text{Sample}(h_{t-1}, G_t)$$

$$i_t = \sigma(W_{Ii} * I_t + W_{ci} * C_{t-1} + b_i)$$

$$f_t = \sigma(W_{If} * I_t + W_{cf} * C_{t-1} + b_f)$$

$$h_t = f_t \odot \tilde{h}_t + i_t \odot \text{CNN}(I_t)$$

$$C_t = \text{CNN}(h_t)$$

As a major difference to the previous cases, the intermediate grid-generation sequence $C_{t-1}$ is formed by a past portion of the output sequence $h_t$ processed by an inner CNN 18 as shown at the right-end side of CNN 60.

Figure 7:
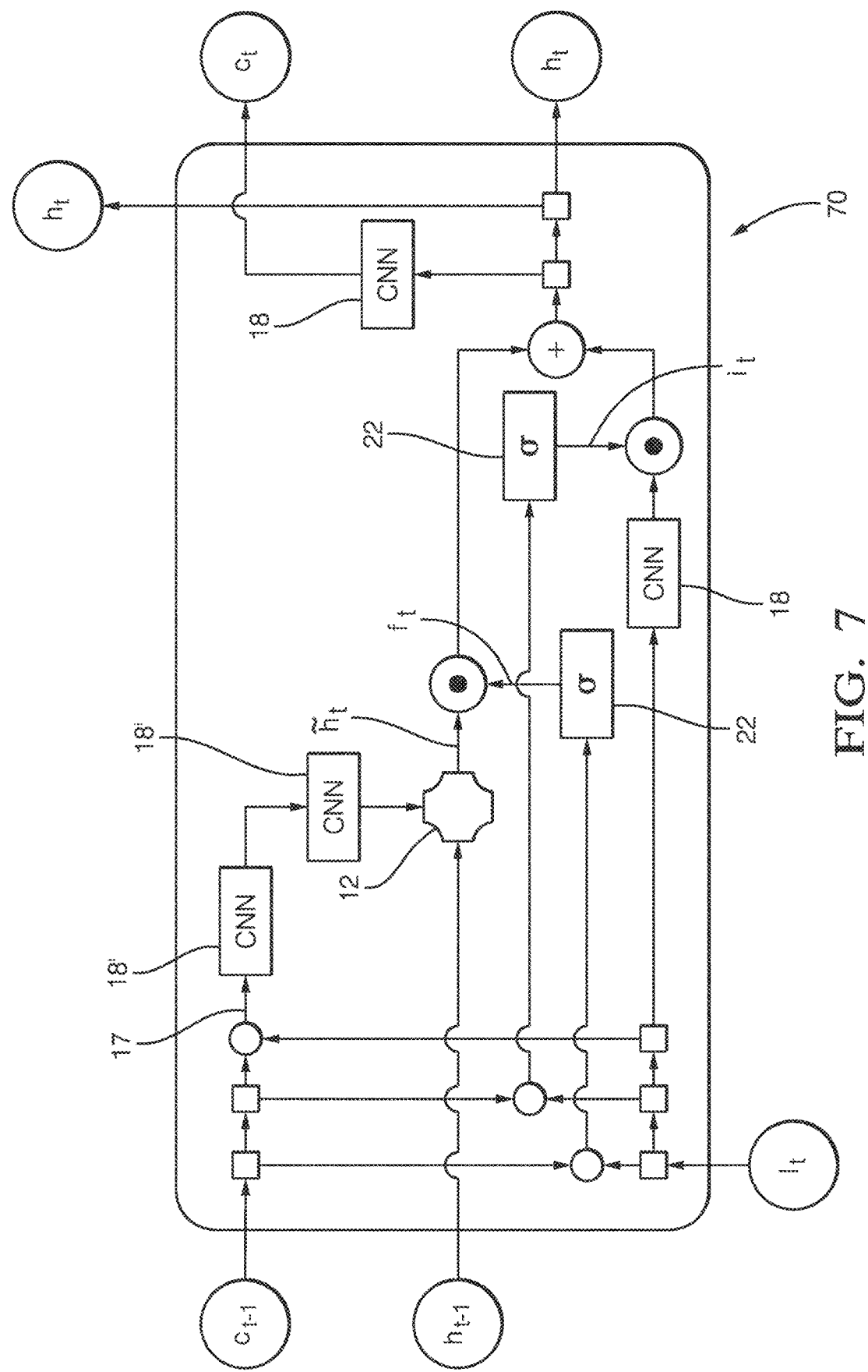

CNN 70 shown in FIG. 7 is described by the following equations:

$$\tilde{C}_t = \text{CNN}(I_t, C_{t-1})$$

$$G_t = \text{CNN}(\tilde{C}_t)$$

$$\tilde{h}_t = \text{Sample}(h_{t-1}, G_t)$$

$$i_t = \sigma(W_{Ii} * I_t + W_{ci} * C_{t-1} + b_i)$$

$$f_t = \sigma(W_{If} * I_t + W_{cf} * C_{t-1} + b_f)$$

$$h_t = f_t \odot \tilde{h}_t + i_t \odot \text{CNN}(I_t)$$

$$C_t = \text{CNN}(h_t)$$

CNN 70 corresponds to CNN 60 but the first and second weighting sequences $f_t$ and $i_t$ are formed as in CNN 50.

Figure 8:
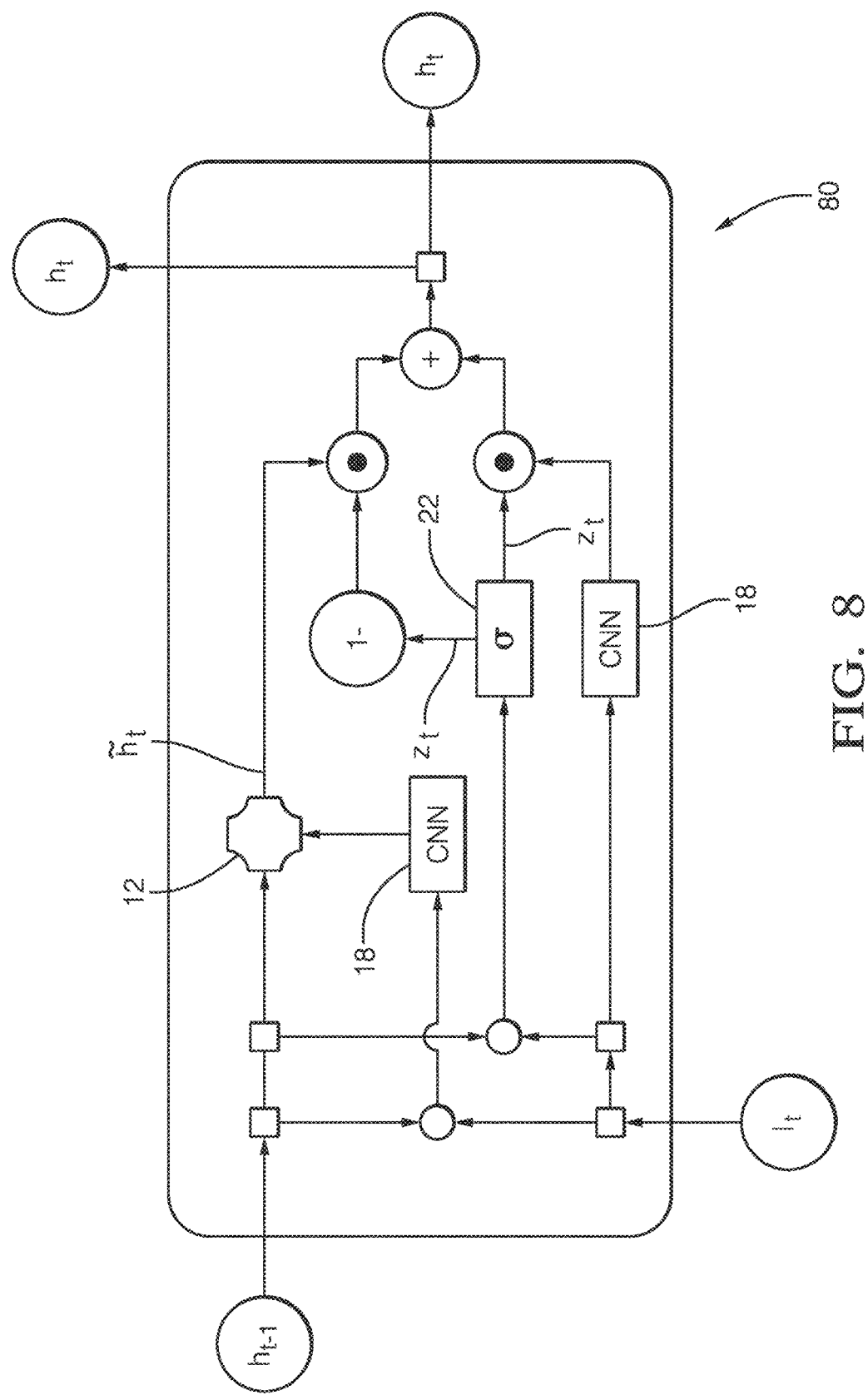

An eighth example is given by CNN 80 shown in FIG. 8. The following set of equations applies:

$$G_t = \text{CNN}(I_t, h_{t-1})$$

$$\tilde{h}_t = \text{Sample}(h_{t-1}, G_t)$$

$$z_t = \sigma(W_{Iz} * I_t + W_{hz} * h_{t-1} + b_z)$$

$$h_t = (1-z_t) \odot \tilde{h}_t + z_t \odot \text{CNN}(I_t)$$

The eighth example corresponds to CNN 10 from FIG. 1 with the difference that the weighting sequence $z_t$ is based on a combination of the input sequence and the past portion of the output sequence.

Figure 9:
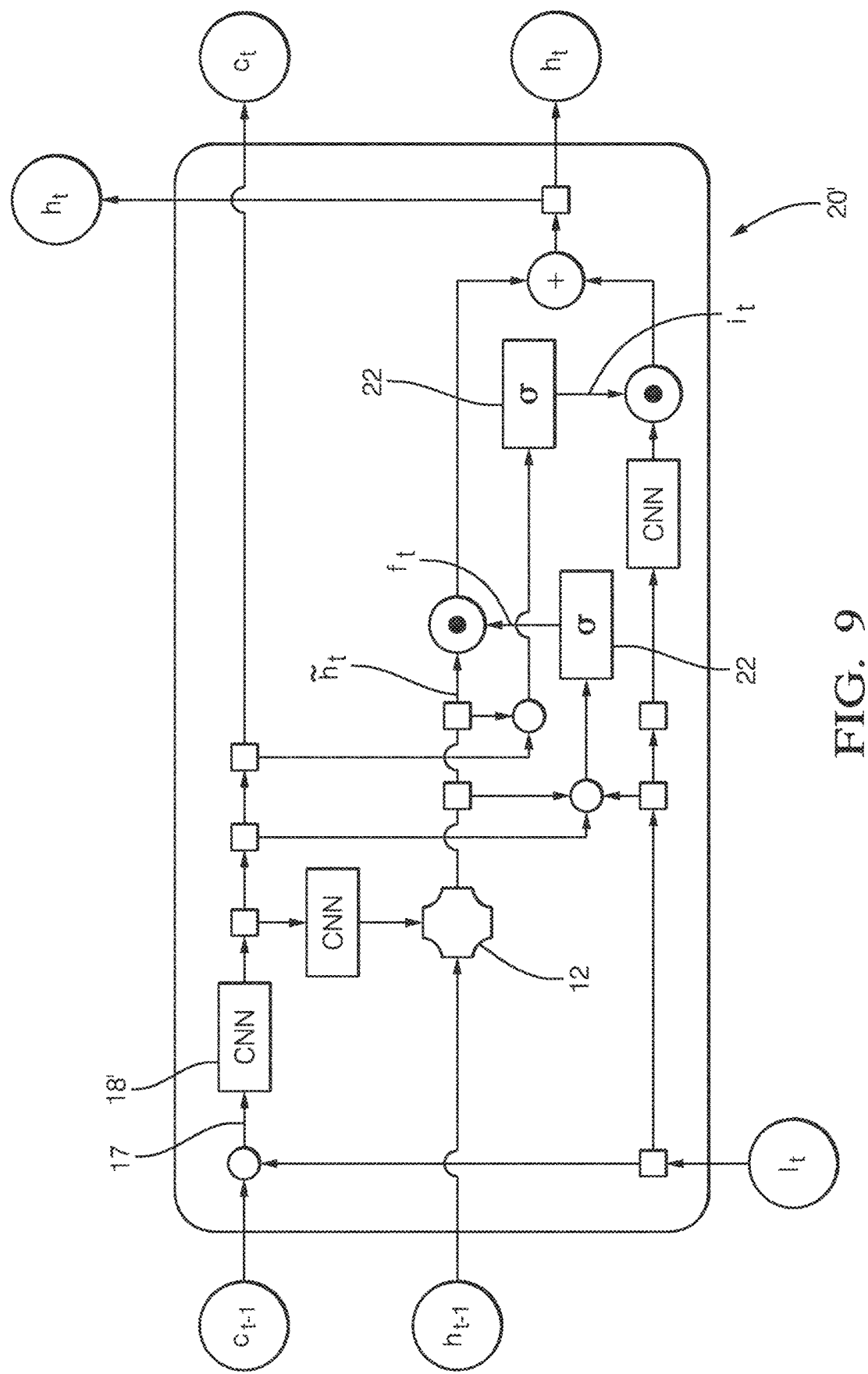

A ninth example, a variant of CNN 20 is given by CNN 20' shown in FIG. 9. The following set of equations applies:

$$C_t = \text{CNN}(I_t, C_{t-1})$$

$$G_t = \text{CNN}(C_t)$$

$$\tilde{h}_t = \text{Sample}(h_{t-1}, G_t)$$

$$i_t = \sigma(W_{Ci} * C_t + W_{hi} * \tilde{h}_t + b_i)$$

$$f_t = \sigma(W_{If} * I_t + W_{hf} * \tilde{h}_t + W_{cf} * C_{t-1} + b_f)$$

$$h_t = f_t \odot \tilde{h}_t + i_t \odot \text{CNN}(I_t)$$

In CNN 20', the first and second weighting sequences are not formed correspondingly with respect to the input of blocks 22. As can be seen from FIG. 9 and the equations, for the first weighting sequence the intermediate output sequence $\tilde{h}_t$ is combined with the grid-generation sequence formed at 17 processed with an inner CNN 18, which is $C_t$ forming the intermediate grid-generation sequence, i.e. data item $C_{t-1}$, for the next time step. In contrast the second weighting sequence is based on a combination of three sequences, as defined in the formula above for $f_t$ and FIG. 9. From this example it becomes apparent that the input to the blocks 22 do not need to be the same.

Figure 10:
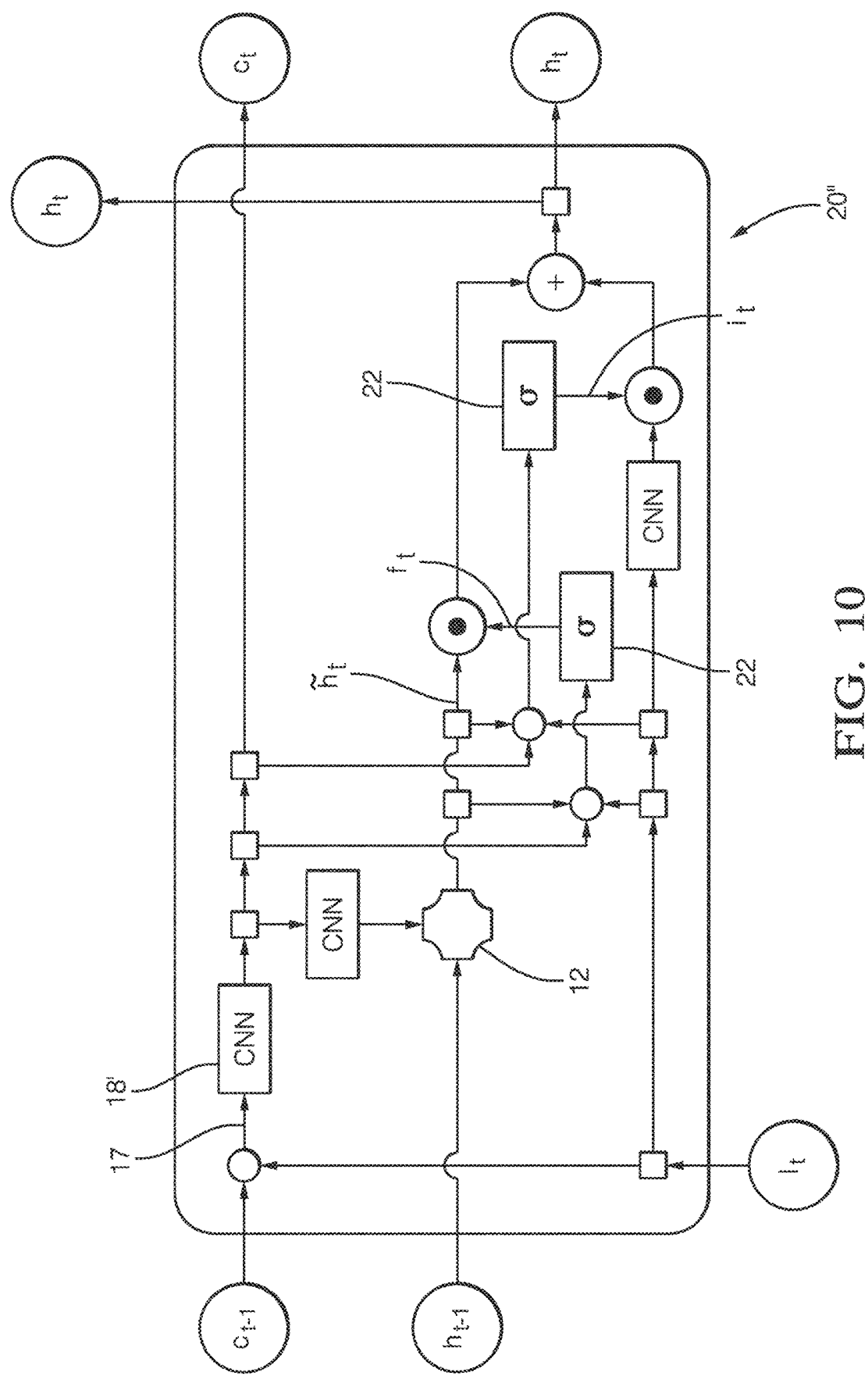

A tenth example is given by CNN 20" shown in FIG. 10. The following set of equations applies:

$$C_t = \text{CNN}(I_t, C_{t-1})$$

$$G_t = \text{CNN}(C_t)$$

$$\tilde{h}_t = \text{Sample}(h_{t-1}, G)$$

$$i_t = (W_{Ii} * I_t + W_{hi} * \tilde{h}_t + W_{ci} * C_t + b_i)$$

$$f_t = \sigma(W_{If} * I_t + W_{hf} * \tilde{h}_t + W_{cf} * C_t + b_f)$$

$$h_t = f_t \odot \tilde{h}_t + i_t \odot \text{CNN}(I_t)$$

CNN 20" corresponds to CNN 20' with the difference that the input to blocks 22 can involve the same combination of sequences. Other combinations are possible, also combinations with more than three sequences.

Figure 11:
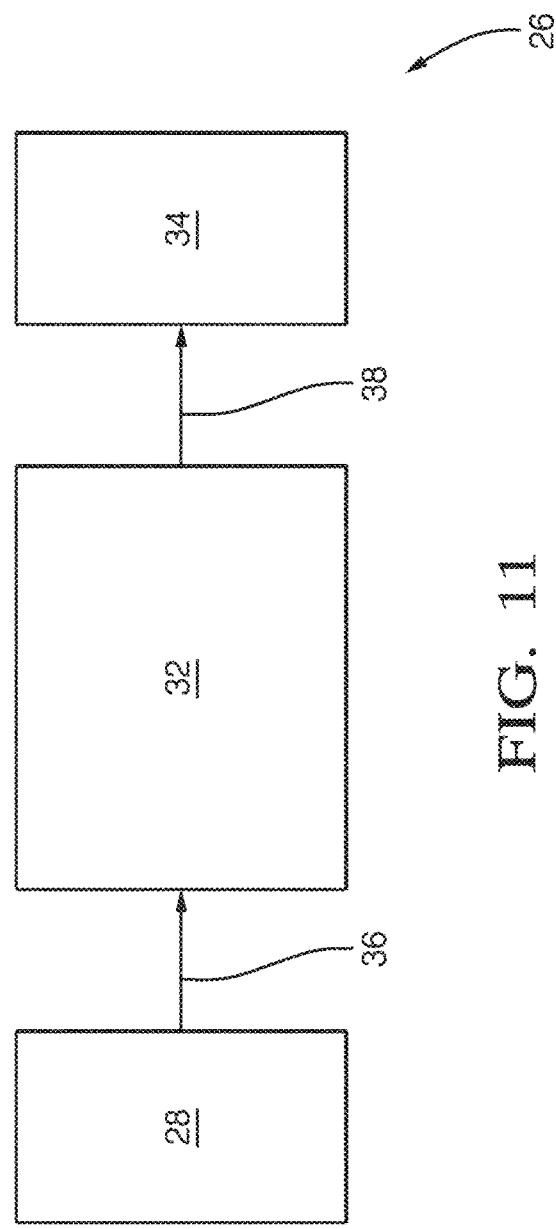
FIG. 11 shows a block diagram of a system comprising a sensor and a device in which any one of the CNNs can be implemented for processing a sensor sequence captured by the sensor.

With reference to FIG. 11, a system 26 can comprise a sensor 28 for capturing (i.e. acquiring) an input sequence 36 for a device 32, wherein the input sequence 36 can represent a scene, for example a traffic scene. The sensor 28 can be a radar sensor mounted on a vehicle (not shown) which is configured for an autonomous driving application by the system 26.

The input sequence 36 is received by device 32 and processed by a CNN, for example by one of the CNNs shown in FIGS. 1 to 10. This is to say that the device 32 has processing means which are configured to make use of a CNN as described herein. An output sequence 38 is outputted by the device 32 and can be inputted to a control unit 34 of a vehicle (not shown). The control unit 34 is configured to control the vehicle on the basis of the output sequence 38.

While this invention has been described in terms of the preferred embodiments thereof, it is not intended to be so limited, but rather only to the extent set forth in the claims that follow.

We claim:

1. A device for processing data sequences comprising a convolutional neural network, the device being configured to receive an input sequence comprising a plurality of data items captured over time, each data item of the plurality of data items comprising a multi-dimensional representation of a scene, the convolutional neural network being configured to:
generate an output sequence representing the input sequence processed item-wise by the convolutional neural network, the convolutional neural network comprising a sampling unit configured to generate an intermediate output sequence by sampling from a past portion of the output sequence according to a sampling grid;
generate the sampling grid item-wise on a basis of a grid-generation sequence, wherein the grid-generation sequence is based on a combination of the input sequence and an intermediate grid-generation sequence representing the past portion of the output sequence or the grid-generation sequence; and
generate the output sequence based on a weighted combination of the intermediate output sequence and the input sequence.

2. The device according to claim 1, wherein the grid-generation sequence is based on an item-wise combination of the input sequence and the intermediate grid-generation sequence.

3. The device according to claim 1, wherein:
the intermediate grid-generation sequence is formed by the past portion of the output sequence;
the intermediate grid-generation sequence is formed by the past portion of the output sequence processed with an inner convolutional neural network; or
the intermediate grid-generation sequence is formed by the past portion of the grid-generation sequence processed with an inner convolutional neural network.

4. The device according to claim 1, wherein the convolutional neural network is configured to generate the sampling grid by processing the grid-generation sequence with at least one inner convolutional neural network.

5. The device according to claim 1, wherein the convolutional neural network is configured to generate the output sequence by generating a first weighting sequence and a second weighting sequence based on one of:
the input sequence;
the intermediate output sequence,
the intermediate grid-generation sequence;
the grid-generation sequence processed by an inner convolutional network;
generating an intermediate input sequence by processing the input sequence with an inner convolutional neural network;
weighting the intermediate output sequence with the first weighting sequence;
weighting the intermediate input sequence with the second weighting sequence; or
superimposing the weighted intermediate output sequence and the weighted intermediate input sequence.

6. The device according to claim 5, wherein generating the first weighting sequence and the second weighting sequence comprises:
forming a combination of at least two of the input sequence, the intermediate output sequence, the intermediate grid-generation sequence, or the grid-generation sequence processed by the inner convolutional network; and
forming a processed combination by processing the combination with an inner convolutional neural network.

7. The device according to claim 6, wherein one of the first weighting sequence or the second weighting sequence is formed by the processed combination and wherein the other of the first weighting sequence or the second weighting sequence is formed by the processed combination subtracted from a constant.

8. The device according to claim 5, wherein the convolutional neural network is configured to generate the first weighting sequence and the second weighting sequence correspondingly.

9. The device according to claim 1, wherein the sampling grid comprises a plurality of sampling locations, each sampling location of the plurality of sampling locations being defined by a respective pair of an offset and one of a plurality of data points of a data item of the intermediate output sequence.

10. The device according to claim 1, wherein each data item of the input sequence comprises a plurality of data points, each data point representing a location in the scene and comprising a plurality of parameters of the location.

11. The device according to claim 1, wherein each data item of the input sequence is formed by an image comprising a plurality of pixels.

12. The device according to claim 10, wherein the plurality of parameters of the location comprise coordinates of the location.

13. A system for processing data sequences, the system comprising:
a sensor for capturing a data sequence; and
a device comprising a convolutional neural network, the device being configured to receive an input sequence comprising a plurality of data items captured over time, each data item of the plurality of data items comprising a multi-dimensional representation of a scene; the convolutional neural network being configured to:
generate an output sequence representing the input sequence processed item-wise by the convolutional neural network, the convolutional neural network comprising a sampling unit configured to generate an intermediate output sequence by sampling from a past portion of the output sequence according to a sampling grid;
generate the sampling grid item-wise on a basis of a grid-generation sequence, wherein the grid-generation sequence is based on a combination of the input sequence and an intermediate grid-generation sequence representing a past portion of the output sequence or the grid-generation sequence; and
generate the output sequence based on a weighted combination of the intermediate output sequence and the input sequence.

14. The system according to claim 13, wherein the sensor comprises at least one of a radar sensor, a light-detection-and-ranging sensor, an ultrasonic sensor, or a camera.

15. The system according to claim 13, wherein the grid-generation sequence is based on an item-wise combination of the input sequence and the intermediate grid-generation sequence.

16. The system according to claim 13, wherein:
the intermediate grid-generation sequence is formed by the past portion of the output sequence;
the intermediate grid-generation sequence is formed by the past portion of the output sequence processed with an inner convolutional neural network; or
the intermediate grid-generation sequence is formed by the past portion of the grid-generation sequence processed with an inner convolutional neural network.

17. The system according to claim 1, wherein the convolutional neural network is configured to generate the sampling grid by processing the grid-generation sequence with at least one inner convolutional neural network.

18. The system according to claim 13, wherein the convolutional neural network is configured to generate the output sequence by generating a first weighting sequence and a second weighting sequence based on one of:
the input sequence;
the intermediate output sequence;
the intermediate grid-generation sequence;
the grid-generation sequence processed by an inner convolutional network;
generating an intermediate input sequence by processing the input sequence with an inner convolutional neural network;
weighting the intermediate output sequence with the first weighting sequence;
weighting the intermediate input sequence with the second weighting sequence; or
superimposing the weighted intermediate output sequence and the weighted intermediate input sequence.

19. The system according to claim 18, wherein generating the first weighting sequence and the second weighting sequence comprises:
forming a combination of at least two of the input sequence, the intermediate output sequence, the intermediate grid-generation sequence, or the grid-generation sequence processed by an inner convolutional network; and
forming a processed combination by processing the combination with an inner convolutional neural network.

20. A method for processing data sequences by means of a convolutional neural network, the method comprising:
receiving an input sequence comprising a plurality of data items captured over time using a sensor, each of said data items comprising a multi-dimensional representation of a scene and
generating an output sequence representing the input sequence processed item-wise by the convolutional neural network,
wherein generating the output sequence comprises:
generating a grid-generation sequence based on a combination of the input sequence and an intermediate grid-generation sequence representing a past portion of the output sequence or the grid-generation sequence,
generating a sampling grid on a basis of the grid-generation sequence,
generating an intermediate output sequence by sampling from the past portion of the output sequence according to the sampling grid, and
generating the output sequence based on a weighted combination of the intermediate output sequence and the input sequence.

* * * * *